(12) United States Patent
Boord

(10) Patent No.: US 12,500,914 B2
(45) Date of Patent: *Dec. 16, 2025

(54) AUTOMATED IDENTIFICATION OF FALSE POSITIVES IN DNS TUNNELING DETECTORS

(71) Applicant: Infoblox Inc., Santa Clara, CA (US)

(72) Inventor: Peter Boord, Puyallup, WA (US)

(73) Assignee: Infoblox Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/410,746

(22) Filed: Jan. 11, 2024

(65) Prior Publication Data

US 2024/0146753 A1 May 2, 2024

Related U.S. Application Data

(63) Continuation of application No. 17/366,813, filed on Jul. 2, 2021, now Pat. No. 11,916,942.

(60) Provisional application No. 63/121,756, filed on Dec. 4, 2020.

(51) Int. Cl.
*H04L 9/40* (2022.01)

(52) U.S. Cl.
CPC ...... *H04L 63/1425* (2013.01); *H04L 63/1441* (2013.01); *H04L 63/145* (2013.01)

(58) Field of Classification Search
CPC ............. H04L 61/4511; H04L 63/1425; H04L 63/1416; H04L 63/0227; H04L 63/1441; H04L 63/145; G06N 20/00
See application file for complete search history.

(56) References Cited

U.S. PATENT DOCUMENTS

| 7,426,576 B1 | 9/2008 | Banga |
| 7,970,878 B1 | 6/2011 | Burshan |
| 8,260,914 B1 | 9/2012 | Ranjan |
| 8,539,577 B1 | 9/2013 | Stewart |

(Continued)

FOREIGN PATENT DOCUMENTS

| JP | 2011193343 | 9/2011 |
| JP | 2013519257 | 5/2013 |

OTHER PUBLICATIONS

Lambion et al., "Malicious DNS Tunneling Detection in Real-Traffic DNS Data," 2020 IEEE International Conference on Big Data (Big Data) Year: 2020 | Conference Paper | Publisher: IEEE.*

(Continued)

*Primary Examiner* — Roderick Tolentino
(74) *Attorney, Agent, or Firm* — Van Pelt, Yi & James LLP

(57) ABSTRACT

Techniques for automated identification of false positives in DNS tunneling detectors are disclosed. In some embodiments, a system, process, and/or computer program product for automated identification of false positives in DNS tunneling detectors includes receiving a set of passive DNS data, wherein the set of passive DNS data includes a DNS query and a DNS response for resolution of the DNS query for each of a plurality of DNS queries; extracting a plurality of features associated with each domain in the set of passive DNS data; and classifying DNS tunneling activities and performing false positive reduction using the plurality of features associated with each domain in the set of passive DNS data to reduce false positive detections.

17 Claims, 6 Drawing Sheets

(56) References Cited

U.S. PATENT DOCUMENTS

| | | | |
|---|---|---|---|
| 8,904,524 | B1 | 12/2014 | Hodgman |
| 9,178,876 | B1 | 11/2015 | Johansson |
| 9,560,072 | B1* | 1/2017 | Xu ..................... H04L 63/1475 |
| 9,749,336 | B1* | 8/2017 | Zhang ................. H04L 63/14 |
| 9,917,852 | B1* | 3/2018 | Xu ..................... H04L 63/1483 |
| 2006/0031928 | A1 | 2/2006 | Conley |
| 2007/0261112 | A1 | 11/2007 | Todd |
| 2009/0158430 | A1 | 6/2009 | Borders |
| 2011/0191455 | A1 | 8/2011 | Gardner |
| 2011/0311140 | A1 | 12/2011 | Urbach |
| 2012/0042381 | A1 | 2/2012 | Antonakakis |
| 2012/0054860 | A1 | 3/2012 | Wyschogrod |
| 2012/0054869 | A1 | 3/2012 | Yen |
| 2012/0254333 | A1 | 10/2012 | Chandramouli |
| 2013/0283337 | A1 | 10/2013 | Schechter |
| 2014/0307551 | A1 | 10/2014 | Forssell |
| 2014/0310808 | A1 | 10/2014 | Yao |
| 2014/0344345 | A1 | 11/2014 | Venkatraman |
| 2015/0082431 | A1 | 3/2015 | Davis |
| 2015/0195299 | A1 | 7/2015 | Zoldi |
| 2016/0026796 | A1 | 1/2016 | Monrose |
| 2016/0036844 | A1* | 2/2016 | Kopp ..................... G06N 5/045 726/1 |
| 2016/0065611 | A1 | 3/2016 | Fakeri-Tabrizi |
| 2016/0099852 | A1 | 4/2016 | Cook |
| 2016/0127395 | A1 | 5/2016 | Underwood |
| 2016/0294773 | A1* | 10/2016 | Yu ....................... H04L 63/1425 |
| 2019/0058718 | A1* | 2/2019 | Pangeni .............. H04L 63/1425 |
| 2020/0351244 | A1* | 11/2020 | Moore ................... H04L 63/20 |
| 2021/0126901 | A1* | 4/2021 | Rodriguez ............. G06N 20/20 |
| 2021/0258325 | A1* | 8/2021 | Meyer .................. H04L 61/4511 |
| 2021/0266293 | A1* | 8/2021 | Liu ...................... H04L 61/5007 |

OTHER PUBLICATIONS

Singh et al., "Detecting Malicious DNS over HTTPS Traffic Using Machine Learning," 2020 International Conference on Innovation and Intelligence for Informatics, Computing and Technologies (3ICT) Year: 2020 | Conference Paper | Publisher: IEEE.*
Antonakakis et al., Building a Dynamic Reputation System for DNS, downloaded on Jan. 27, 2014.
Antonakakis et al., Detecting Malware Domains at the Upper DNS Hierarchy, downloaded on Jan. 27, 2014.
Author Unknown, Alexa—The Web Information Company, Analytics for any Website, downloaded from http://www.alexa.com/ on Jan. 28, 2014.
Author Unknown, Apache Kafka, A High-Throughput Distributed Messaging System, downloaded from https://kafka.apache.org/ on Jan. 28, 2014.
Author Unknown, Catching DNS Tunnels with IDS that doesn't suck A.I, downloaded on Sep. 28, 2015.
Author Unknown, FSI, downloaded from https://www.farsightsecurity.com/ on Jan. 28, 2014.
Author Unknown, Google Books, Ngram Viewer, downloaded from http://storage.googleapis.com/books/ngrams/books/datasetsv2.html on Sep. 22, 2015.
Author Unknown, HBase—Apache HBase Home, downloaded from http://hbase.apache.org/ on Jan. 28, 2014.
Author Unknown, Internet Systems Consortium, Maintainers of BIND and ISC DHCP, downloaded from http://www.isc.org/ on Jan. 28, 2014.
Author Unknown, Internet Systems Consortium, Maintainers of BIND and ISC DHCP, downloaded from http://www.isc.org/ on Sep. 22, 2015.
Author Unknown, Kyro.se: Iodine, Jun. 16, 2014.
Author Unknown, Storm, downloaded from http://storm-project.net/ on Jan. 28, 2014.
Author Unknown, Welcome to Apache Hadoop, What is Apache Hadoop?, downloaded from http://hadoop.apache.org/ on Jan. 28, 2014.
Bilge et al., "Exposure: Finding Malicious Domains Using Passive DNS Analysis", NDSS 2011, 18th Annual Network and Distributed System Security Symposium, Feb. 2011, San Diego, CA.
Bilge et al., Exposure: Finding Malicious Domains Using Passive DNS Analysis, Conference: Proceedings of the Network and Distributed System Security Symposium, NDSS, Jan. 2011, pp. 1-17.
Borders et al., Web Tap: Detecting Covert Web Traffic, CCS'04, Washington, DC, USA, ACM, Oct. 25-29, 2004.
Born et al., Detecting DNS Tunnels Using Character Frequency Analysis, 2010.
Burton et al., Whitelists that Work: Creating Defensible Dynamic Whitelists with Statistical Learning, Nov. 2019.
C.E. Shannon, A Mathematical Theory of Communication, Reprinted with Correction from The Bell System Technical Journal, vol. 27, Jul. and Oct. 1948.
Cejka et al., Stream-Wise Detection of Surreptitious Traffic over DNS, Proceeding of 2014 IEEE 19th International Workshop on Computer Aided Modeling and Design of Communication Links and Networks (CAMAD), IEEE, Dec. 1, 2014, pp. 300-304.
Chang et al., Bigtable: A Distributed Storage System for Structured Data, OSDI, 2006.
Crotti et al., Detecting HTTP Tunnels with Statistical Mechanisms, 2007.
Dr. Jim Metzler, The 2012 Cloud Networking Report, Dec. 2012.
Dusi et al., A Preliminary Look at the Privacy of SSH Tunnels, 17th IEEE International Conference on Computer Communication and Networks (ICCCN'08), U.S. Virgin Islands, Aug. 3-7, 2008.
Dusi et al., Detection of Encrypted Tunnels Across Network Boundaries, IEEE, 2008.
Ellens et al., Flow-Based Detection of DNS Tunnels, IFIP International Federation for Information Processing, AIMS 2013, LNCS 7943, pp. 124-135, 2013.
Greg Farnham et al., Detecting DNS Tunneling, SANS Institute InfoSec Reading Room, accepted on Feb. 25, 2013.
Hoffman et al., A Covert Channel in TTL Field of DNS Packets, Rochester Institute of Technology, RIT Scholar Works, Jul. 2012, pp. 1-5.
Hu et al., RB-Seeker: Auto-detection of Redirection Botnets, downloaded on Jan. 27, 2014.
Ishibashi et al., [Invited Talk] Anomalous Traffic Observed in DNS, The Institute of Electronics Information and Communication Engineers, IEICE Technical Report, published Jul. 2, 2009.
Joe St. Sauver, Record Type=Null, Records in DNSDB Mtbl Files, Mar. 8, 2017.
Kara et al., Detection of Malicious Payload Distribution Channels in DNS, Proceeding of 2014 IEEE International Conference on Communications (ICC), IEEE, Jun. 10, 2014, pp. 853-858.
Konte et al., Dynamics of Online Scam Hosting Infrastructure, downloaded on Jan. 27, 2014.
Lambion et al., "Malicious DNS Tunneling Detection in Real-Traffic DNS Data," 2020 IEEE International Conference on Big Data (U Big Data) Year: 2020 | Conference Paper| Publisher: IEEE.
Nadler et al., Detection of Malicious and Low Throughput Data Exfiltration Over the DNS Protocol, Jun. 18, 2018.
P.Vixie, Network Working Group, ISC, Extension Mechanisms for DNS (EDNS0), Aug. 1999.
Paxson et al., Practical Comprehensive Bounds on Surreptitious Communication Over DNS, Proceedings of the 22nd USENIX Security Symposium, Aug. 14-16, 2013, Washington, D.C., USA.
Qi et al., A Bigram Based Real Time DNS Tunnel Detection Approach, Information Technology and Quantitative Management (ITQM2013), Procedia Computer Science 17 (2013) pp. 852-860.
Romana et al., Entropy Based Analysis of DNS Query Traffic in the Campus Network, Systemics, Cybernetic and Informatics, vol. 6, No. 5, pp. 42-44, 2007.
Tanaka et al., Extracting Malicious Website from DNS Log-Analysis Method and Anonymity, Computer Security Symposium 2013 Papers, Information Processing Society, Oct. 14, 2013, vol. 2013, No. 4.
Tsuda et al., A Detection System which uses DNS Traffic Features to Detect Domains which are Related to Botnets, Technical Study Report by the Institute of Electronics, Information and Communication Engineers, Feb. 24, 2015, vol. 114, No. 489.

(56) References Cited

OTHER PUBLICATIONS

Yamada et al., Anomaly Client Detection by Monitoring DNS Server Traffic, Technical Study Report by the Institute of Electronics, Information and Communication Engineers, Sep. 4, 2008, vol. 108, No. 2013.

Yu et al., Behavior Analysis Based DNS Tunneling Detection and Classification with Big Data Technologies, Proceedings of the International Conference on Internet of Things and Big Data, 2016, pp. 284-290.

Yu et al., Semi-Supervised Time Series Modeling for Real-Time Flux Domain Detection on Passive DNS Traffic, MLDM 2014, LNAI 8556, pp. 258-271, 2014.

\* cited by examiner

AUTOMATED IDENTIFICATION OF FALSE POSITIVES IN DNS TUNNELING DETECTORS

CROSS REFERENCE TO OTHER APPLICATIONS

This application is a continuation of U.S. patent application Ser. No. 17/366,813, entitled AUTOMATED IDENTIFICATION OF FALSE POSITIVES IN DNS TUNNELING DETECTORS filed Jul. 2, 2021 which is incorporated herein by reference for all purposes, which claims priority to U.S. Provisional Patent Application No. 63/121,756 entitled AUTOMATED IDENTIFICATION OF FALSE POSITIVES IN DNS TUNNELING DETECTORS filed Dec. 4, 2020, which is incorporated herein by reference for all purposes.

BACKGROUND OF THE INVENTION

Domain Name System (DNS) network services are generally ubiquitous in IP-based networks. DNS tunneling is an approach used to convey messages through TCP tunnels over the DNS protocol that is typically not blocked or monitored by security enforcement, such as firewalls or other networking/security solutions.

As such, DNS tunneling can be utilized in many malicious ways that can compromise the security of a network. For example, DNS tunneling can be used for various malicious/unauthorized activities, such as data exfiltration, cyber-espionage, and/or command and control (C&C) activities.

BRIEF DESCRIPTION OF THE DRAWINGS

Various embodiments of the invention are disclosed in the following detailed description and the accompanying drawings.

DETAILED DESCRIPTION

Figure 1:
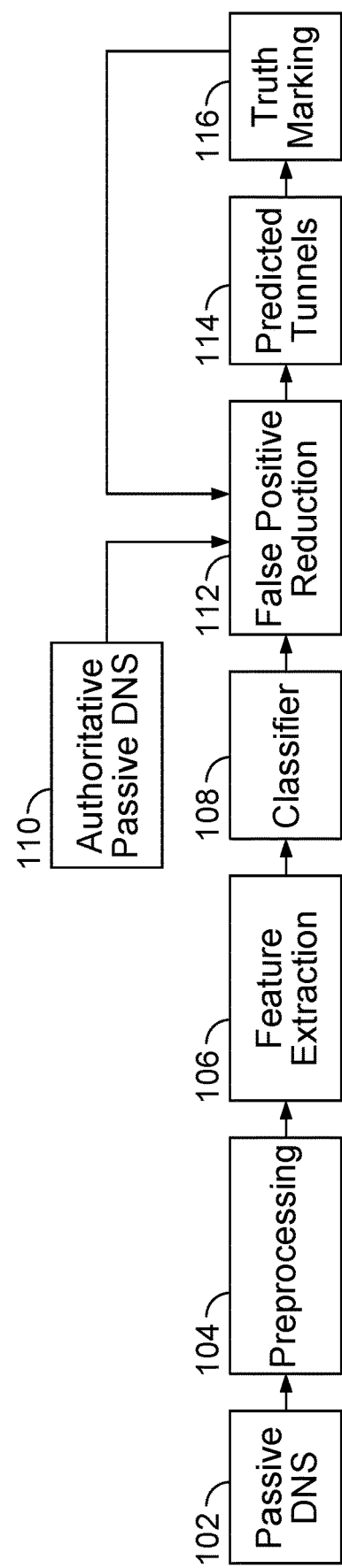
FIG. 1 is a diagram of a system for a retransmission-based DNS tunneling detector with false positive detection in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generally, a client (e.g., a computing device) attempts to connect to a server(s) (e.g., a web server) over the Internet by using web addresses (e.g., Uniform Resource Locators (URLs) including domain names or fully qualified domain names (FQDN)); the aforesaid are translated into IP addresses. The Domain Name System (DNS) is responsible for performing this translation from web addresses into IP addresses. Specifically, requests including web addresses are sent to DNS servers that reply with corresponding IP addresses or with an error message in case the domain has not been registered, a non-existent domain (e.g., an NX Domain response).

DNS network services are generally ubiquitous in IP-based networks. DNS tunneling is an approach used to convey messages through Transmission Control Protocol (TCP) tunnels over DNS protocol that is typically not blocked or monitored by security enforcement, such as by firewalls or other network/security monitoring devices/solutions.

DNS tunneling generally works by encapsulating data into DNS packets. Typically, the tunnel client encapsulates the data to be sent in a query for a specific domain name. The DNS resolver treats the tunnel traffic as a regular request by starting the DNS look-up process for the requested domain name, possibly recursively consulting other DNS resolvers. At the end of this operation, the request is processed by the tunnel server. The tunnel server retrieves the encapsulated data and responds to DNS queries by enclosing tunnel data in the answer section of the DNS response message.

Although most DNS tunneling techniques typically use 'TXT' type queries in DNS that can maximize the payload in response packets, there are various implementations that make use of DNS query types other than 'TXT' such as 'A,' 'AAAA,' 'CNAME,' 'NS,' 'MX,' and so on.

DNS tunneling can be utilized in many malicious ways that can compromise the security of a network (e.g., an enterprise network). For example, DNS tunneling can be used for various malicious/unauthorized activities, such as data exfiltration, cyber-espionage, and/or command and control (C&C) activities.

Various approaches exist for detection of DNS tunneling activities. DNS tunnels can be detected by analyzing a single DNS payload based on the fundamental aspect that the tunnel is used to convey information. But DNS tunnels are also often used by legitimate users to transfer short messages, such as heartbeats. Single payload-based approaches to DNS tunnel activities detection have less latency in detection but generally cannot provide an accurate classification between legitimate DNS tunnel activities and malicious DNS tunnel activities.

Existing approaches for detecting DNS tunneling (DNST) activities are generally not able to effectively and efficiently distinguish between legitimate DNS tunnel activities and malicious DNS tunneling activities even if they can detect the DNS tunneling activities on a network (e.g., enterprise network). This results in false positives for DNS tunneling detection as legitimate, non-malicious DNS tunneling activities would also be detected by such existing approaches for detecting DNS tunneling activities.

As such, the existing, traditional approaches for DNS tunneling detection are not effective due to the technical problem of having too many false positive detections. Thus, what are needed are new and improved techniques for automatically detecting DNS tunneling (e.g., DNST activities) that reduce false positive detections.

Overview of Techniques for Automated Identification of False Positives in DNS Tunneling Detectors Accordingly, various techniques for automated identification of false positives in DNS tunneling detectors are disclosed. For example, new and improved techniques for detecting DNS tunneling (e.g., for detecting malicious DNS tunneling activities including DNST malware) that reduce false positive detections are disclosed.

In some embodiments, a system, process, and/or computer program product for automated identification of false positives in DNS tunneling detectors includes receiving a set of passive DNS data, wherein the set of passive DNS data includes a DNS query and a DNS response for resolution of the DNS query for each of a plurality of DNS queries (e.g., and the set of passive DNS data is preprocessed to automatically filter a set of domains included in the set of passive DNS data); extracting a plurality of features associated with each domain in the set of passive DNS data (e.g., extracting features based on name server information and/or based on a retransmission rate of queries and/or responses associated with a domain, such as further described below); and classifying DNS tunneling activities and performing false positive reduction using the plurality of features associated with each domain in the set of passive DNS data to reduce false positive detections, such as will be further described below.

In some embodiments, a system, process, and/or computer program product for automated identification of false positives in DNS tunneling detectors further includes determining a ratio of a unique number of sub-prefixes to a total number of queries for each domain in a filtered set of passive DNS data, such as will be further described below.

In some embodiments, a system, process, and/or computer program product for automated identification of false positives in DNS tunneling detectors further includes calculating a time span between a latest and an earliest observation of each sub-prefix in each domain in a filtered set of passive DNS data, such as will be further described below.

In some embodiments, a system, process, and/or computer program product for automated identification of false positives in DNS tunneling detectors further includes performing a mitigation action in response to detecting a malicious DNS tunneling activity, such as will be further described below.

For example, the disclosed techniques facilitate automated detection of DNS tunneling activities while minimizing false positive detections (e.g., including from reputable sources) as further described below. Excessive false positive detections can create a significant burden for customers of DNS threat detector security solutions and, as a result, can reduce the customer experience and utility of these DNS tunnel detection security solutions. In some cases, too many false positive detections may make it less likely that a given customer will use such security solutions to block malicious DNST detected traffic to avoid the risks of blocking legitimate DNS traffic resulting from such false positive detections. Excessive false positive detections also create a significant burden for security/threat analysts who spend additional time and resources to verify the level of threat associated with various false positive detections (e.g., manually reviewing thousands of DNST detections per day).

In some cases, blocking network (e.g., Internet) traffic from a reputable source can be potentially more damaging than potentially allowing traffic from a malicious site. The disclosed techniques reduce that risk for threats where actors control a name server. This includes DNS tunneling and Fast Flux DNS, which typically generate the most significant number of false positive detections for DNS tunneling detection security solutions.

In an example implementation, the disclosed techniques automatically identify false positive detections for DNS tunneling activities, thereby reducing the cost and time required by threat analysts and providing a better customer experience for DNS tunneling detection security solutions. In this example implementation, the disclosed techniques detect DNS tunneling based on the propensity of DNS tunneling software to retransmit queries and/or responses when a communication error occurs. For example, retransmission can be detected by measuring a maximum time difference between repeated query names and/or responses and then comparing this value to a threshold as will be further described below.

In addition, the disclosed techniques provide a mechanism to detect false positives by assessing the likelihood that a threat actor could have control of a name server, where such control is necessary, as is the case for DNS tunneling. In this example implementation, name servers are ranked according to the number of domains they host and DNS tunneling detections are marked as false positives if the purported tunneling domain uses a highly ranked name server as will also be further described below. The use of such highly ranked name servers (e.g., top name servers) as a mechanism/feature for reducing DNST false positives is a reliable mechanism/feature as such name servers serving the most domains are generally robust/hardened against attacks/compromised control by threat actors (e.g., it would also be difficult for a threat actor to circumvent this mechanism/feature as it would require significant infrastructure to set up a top ranked name server). Moreover, using such top name servers allows the disclosed mechanism/feature to be automated, and automating the labeling of false positives simultaneously reduces the requirement for security/threat analysts to provide a manual review and improves the customer experience for such DNST detection security solutions. As a result, the disclosed mechanism/feature of using highly ranked name servers can also effectively and efficiently reduce false positive detections, such as often associated with popular domains as well as Content Domain Networks (CDNs) related traffic.

For example, the disclosed techniques also address a problem of identifying DNS tunnels based on the readability/non-readability of the DNS query/response. DNST detection approaches based on the readability/non-readability of the DNS query/response are increasingly prone to false positives due to the increasing legitimate use of non-readable DNS queries. As such, the disclosed techniques described herein detect tunnels using various features that are not dependent on the non-readability of DNS queries. The disclosed techniques described herein also address another significant problem with existing DNST solutions through a measure of name server robustness, which also facilitates reducing false positives as will also be further described below.

Various system and process embodiments for performing the disclosed automated identification of false positives in DNS tunneling detectors techniques including various techniques for a retransmission-based DNS tunneling detector with false positive detection will now be further described below.

Overview of a System and a System Architecture for a Retransmission-Based DNS Tunneling Detector with False Positive Detection FIG. 1 is a diagram of a system for a retransmission-based DNS tunneling detector with false positive detection in accordance with some embodiments. FIG. 1 illustrates a multi-stage automated DNS tunneling (DNST) detector with false positive detection that can be deployed for reducing false positives for DNST detection. Specifically, the multi-stage automated DNST detector with a false positive detection system can be used to perform the disclosed techniques for automated identification of false positives in DNS tunneling detectors including various techniques for a retransmission-based DNS tunneling detector with false positive detection which will now be further described below.

Referring to FIG. 1, Passive DNS traffic is received as shown at 102. The received Passive DNS traffic is passed to a Preprocessing component 104 for performing the preprocessing of the passive DNS. In an example implementation, these preprocessing operations are performed on a set of observed DNS traffic that is collected over a predetermined period of time (e.g., a day, an hour, or some other period of time of a collected set of DNS traffic, which includes potential DNST related DNS traffic) as will be further described below with respect to FIG. 2.

The preprocessed DNS traffic is then passed to a Feature Extraction component 106 for performing feature extraction. The Feature Extraction component extracts a set of features for each domain as will be further described below. The extracted set of features for each domain are passed to a Classifier component 108. The Classifier (e.g., a Naïve Bayes classifier, coded in the Python language) is trained to distinguish known DNS tunnels from known false positive DNS tunnels (e.g., detected from a commercially available DNST detector solution, such as the DNST detector solution that is commercially available from Infoblox Inc. headquartered in Santa Clara, CA). Specifically, the classifier is trained to predict if a given domain is a purported tunnel based on the extracted features as will be further described below.

As also shown in FIG. 1, Authoritative Passive DNS 110 is provided as input to a False Positive Reduction 112 and used to infer reputable name servers. Specifically, the False Positive Reduction component removes domains associated with reputable name servers to provide a set of Predicted Tunnels 114 as will be further described below.

Finally, a Truth Marking component 116 is performed to verify DNS tunnels and/or to blacklist name servers found with DNS tunneling activity (e.g., providing a feedback mechanism to improve classification and automated identification of DNST to reduce false positive DNST detections) as will also be further described below.

Figure 2:
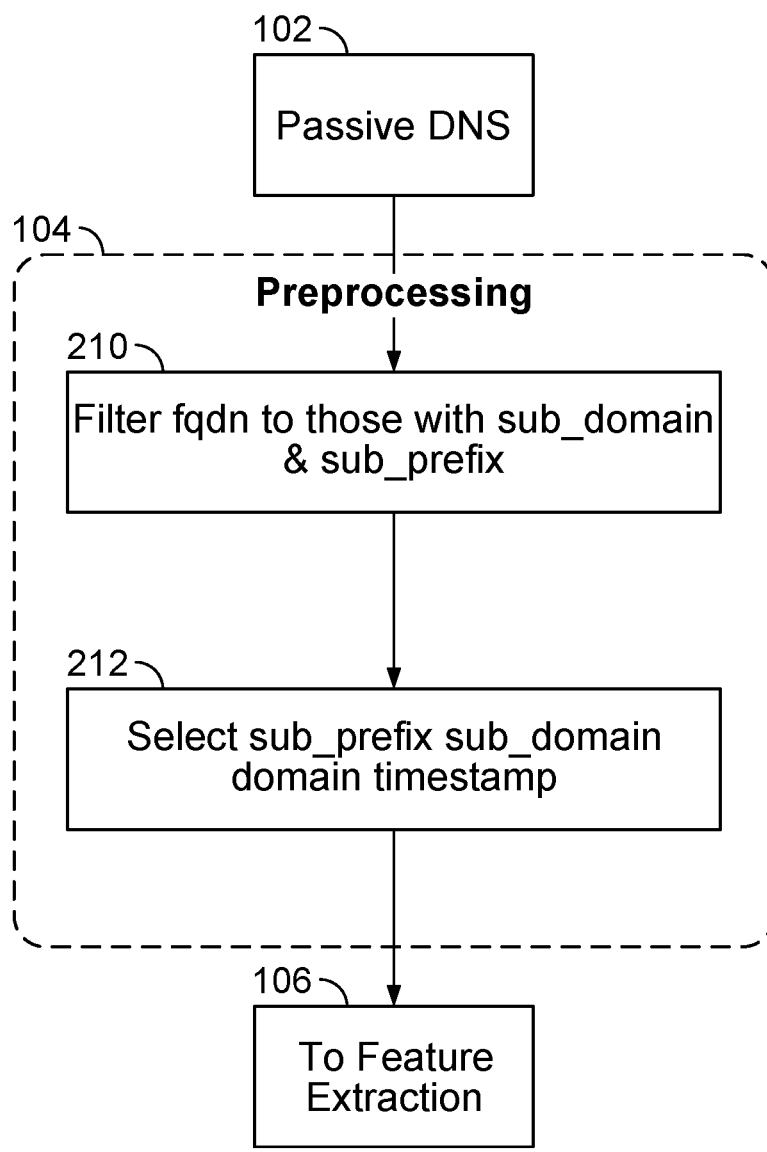
FIG. 2 is a set of operations performed by a Preprocessing component of a system for a retransmission-based DNS tunneling detector with false positive detection in accordance with some embodiments.

FIG. 2 is a set of operations performed by a Preprocessing component of a system for a retransmission-based DNS tunneling detector with false positive detection in accordance with some embodiments. Specifically, FIG. 2 illustrates an example operation performed by Preprocessing component 104 on Passive DNS 102 during the preprocessing stage (e.g., as similarly shown at 104 in FIG. 1) prior to Feature Extraction 106 (e.g., as similarly shown at 106 in FIG. 1) of a system for a retransmission-based DNS tunneling detector with false positive detection.

Referring to FIG. 2, Preprocessing component 104 receives a set of Passive DNS traffic that is collected over a period of time (e.g., a day, hour, etc.) as similarly described above with respect to FIG. 1. At 210, the Preprocessing component filters the Fully Qualified Domain Name (FQDN) for each DNS query that is processed to determine the domain, sub-domain, and sub-domain prefix (sub-prefix) for each DNS query. In this example implementation, only FQDN for the DNS query data with sub-prefix labels is kept for further processing. The domain, sub-domain, and sub-prefix and timestamp information are maintained as shown at 212 to generate features using Feature Extraction component 106 as will be further described below with respect to FIG. 3.

Figure 3:
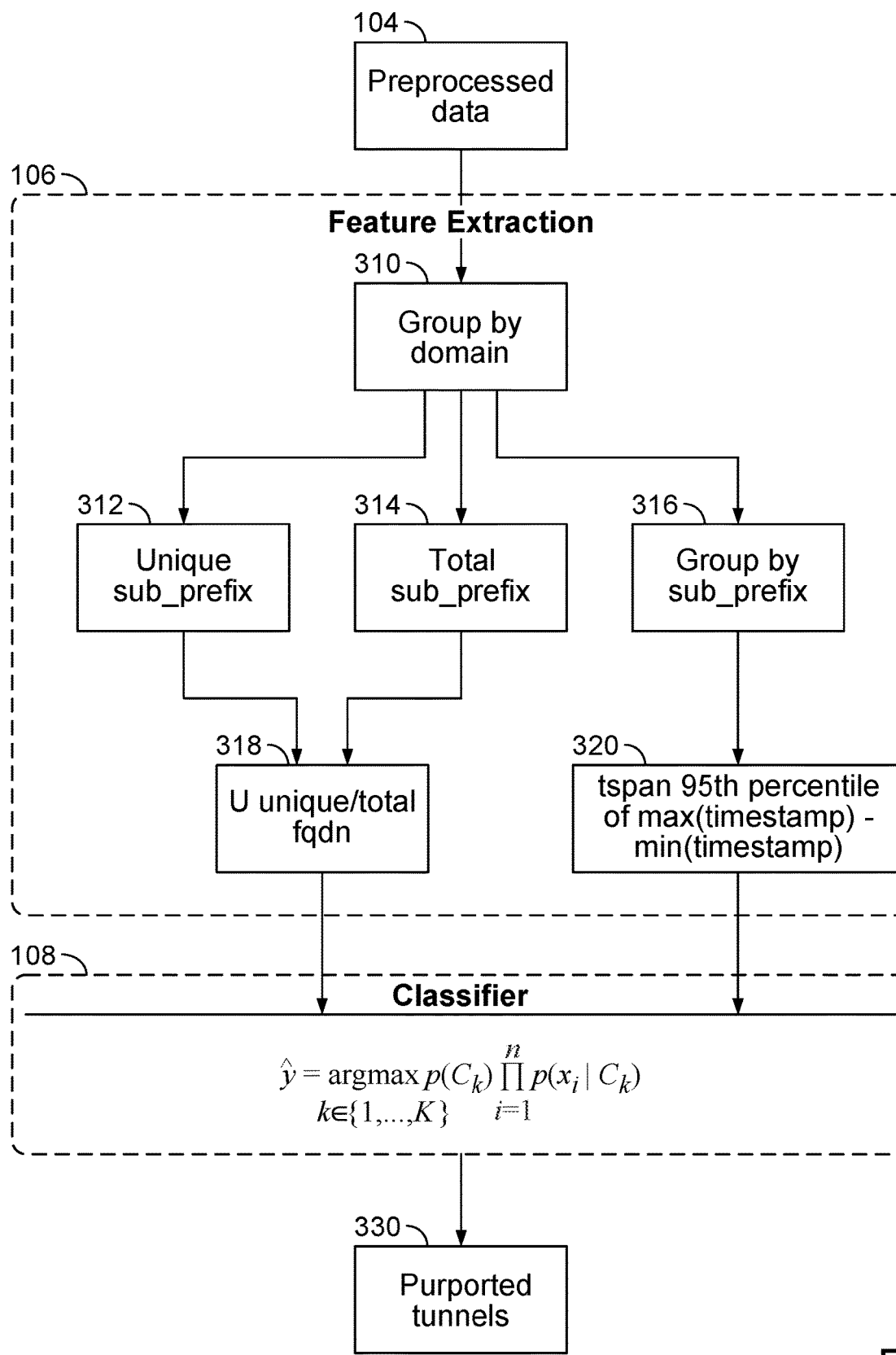
FIG. 3 is a set of operations performed by a Feature Extraction component and a Classifier component of a system for a retransmission-based DNS tunneling detector with false positive detection in accordance with some embodiments.

FIG. 3 is a set of operations performed by a Feature Extraction component and a Classifier component of a system for a retransmission-based DNS tunneling detector with false positive detection in accordance with some embodiments. Specifically, FIG. 3 illustrates an example set of operations performed by Feature Extraction component 106 on Preprocessed data 104 during the feature extraction stage of operations (e.g., as similarly shown at 106 in FIG. 1) on the Preprocessed data 104 (e.g., as similarly shown at 104 in FIG. 1) and Classifier component 108 (e.g., as similarly shown at 108 in FIG. 1) of a system for a retransmission-based DNS tunneling detector with false positive detection.

Referring to FIG. 3, Feature Extraction component 106 receives a set of Preprocessed data 104 for performing feature extraction operations. As described above with respect to FIG. 2, the preprocessed passive DNS data includes the filtered FQDN for the DNS query data with sub-prefix labels, including domain, sub-domain, and sub-prefix and timestamp data, for performing the further feature extraction processing operations.

Generally, Feature Extraction component 106 processes the filtered set of DNS data (104) to generate a set of features for each domain. The filtered set of DNS data (104) is first grouped by domain as shown at 310.

A first feature that is generated for each domain is to determine a ratio of the unique number of sub-prefixes to a total number of queries for the domain Specifically, a unique number of sub-prefixes for the domain are extracted at 312 and a total number of sub-prefixes for the domain are extracted at 314. The ratio of the unique number of sub-prefixes to the total number of queries for the domain (FQDN) is then determined as shown at 318.

Another feature that is generated for each domain is to calculate a time span (e.g., time difference) between the latest and earliest observation of each sub-prefix in the domain. In this example implementation, the time differences are ordered and the 95th percentile is determined (e.g., or another threshold can similarly be determined using the disclosed techniques). Specifically, the domains are grouped by sub-prefixes as shown at 316. A time span (tspan) for the $95^{th}$ percentile of the maximum time stamp minus the minimum time stamp is then determined as shown at 320.

The extracted features for each domain are then provided as input to the Classifier component 108. In this example implementation, the Classifier component performs a set of operations to classify a set of Purported DNS tunnels as shown at 330 as will now be further described below.

In an example implementation, the Classifier component 108 is implemented using semi-supervised/unsupervised machine learning techniques. For example, a set of the above-described extracted features can be used to classify/identify DNS tunnels (e.g., the classifier model can be trained using sets of known tunnel domains and known domains that are not DNS tunnels, but exhibit features of DNS tunnels are used to train the classifier, such as further described below with respect to FIG. 3). One example is a Naïve Bayes classifier. In this instance, the distribution of extracted features is modelled separately for sets of both known tunnels and non-tunnels. One or more multi-dimensional Gaussian distributions, for example, can be used to characterize the distribution of each class in feature space using (1) a centroid, that represents the mean value of features in that class; and (2) a covariance matrix, that represents the variation of the features from the centroid in multidimensional feature space. The classification of DNS traffic from a test domain can then be selected as either DNS tunnel or non-tunnel by choosing the class of the distribution that is closest, by some distance metric, to the features generated for that test domain. The distance metric employed could be, for example, the Mahalinobis distance.

Figure 4:
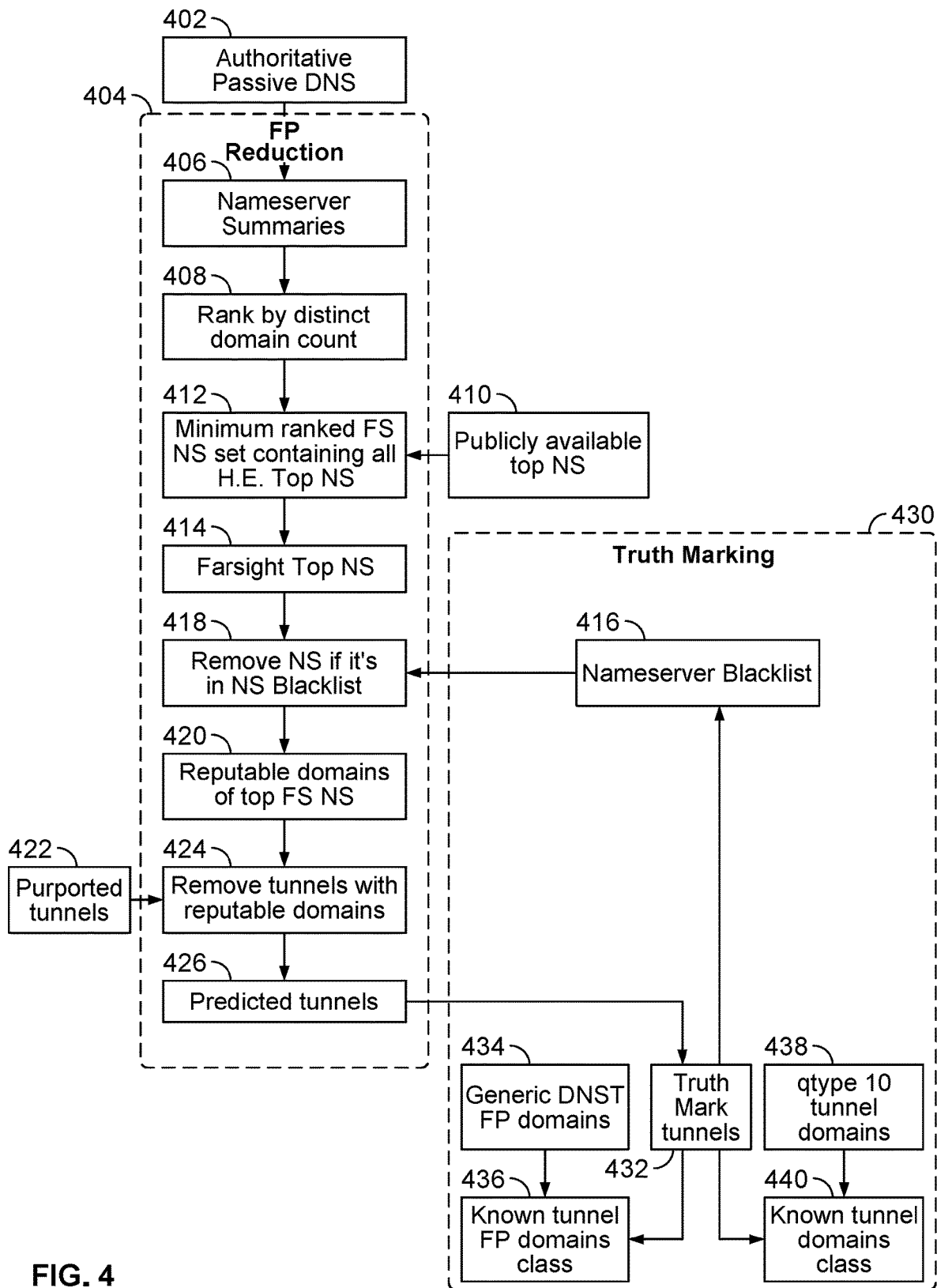
FIG. 4 is an example set of operations performed by a False Positive Reduction component and a Truth Marking component for a retransmission-based DNS tunneling detector with false positive detection in accordance with some embodiments.

FIG. 4 is an example set of operations performed by a False Positive Reduction component and a Truth Marking component for a retransmission-based DNS tunneling detector with false positive detection in accordance with some embodiments. In an example implementation, these operations for False Positive (FP) reduction (404) and Truth Marking (430) are performed by the system for a retransmission-based DNS tunneling detector with false positive detection as similarly described above and as shown in FIGS. 1-3.

Referring to FIG. 4, Authoritative Passive DNS 402 is collected over a predetermined period of time (e.g., one day or another period of time) and provided as input for performing a set of False Positive (FP) reduction operations 404. DNS responses containing name server referral records are used to map domains to their name servers to generate Name Server Summaries as shown at 406. Name servers are ranked according to the number of domains that they serve (e.g., ranked by distinct domain count) as shown at 408. For example, the disclosed techniques include determining a rank robustness of name servers according to how many domains that they host. The latter can be calculated using DNS referrals found in a passive DNS stream. Publicly available name server ranking services can be used to find a set of purportedly resilient name servers. Specifically, a set of Publicly Available Top Name Servers (NS) 410 are provided as input to an operation for determining a Minimum Ranked Name Servers (NS) set containing all Top NS (e.g., implemented using a Smartlisting approach that has similarly been used for top domains; in this example implementation, collect all nameservers from a passive DNS (pDNS) source, such as Infoblox customer data or another pDNS source; rank them according to their volume of usage in pDNS traffic for a single day; and remove any nameservers with domains or subdomains that where threats had been detected, such as generally described in Whitelists that Work: Creating Defensible Dynamic Whitelists with Statistical Learning, by Renee Burton and Laura Rocha, Nov. 14, 2019, available at https://docs.apwg.org/ecrimeresearch/2019/Nov14_ReneeBurton.pdf) as shown at 412. A set of top Name Servers (NS) 414 (e.g., using a commercially available source of top Name Servers, such as from a commercially available pDNS source of Name Servers) and a Name Server Blacklist 416 are both provided as input for an operation to remove a Name Server if it is on the Name Server blacklist as shown at 418. For example, name servers are removed from the set if truth marking (e.g., performed by a DNS security analyst(s), such as for semi-supervised classifier training, and/or using various automated mechanisms to similarly perform the disclosed truth marking operations) places them on the Name Server Blacklist (416). Domains of the remaining name servers are excluded from the list of purported tunnels to reduce the chance of false positives. The resulting set is a set of reputable domains of top Name Servers as shown at 420. Purported tunnels 422 (e.g., such as Purported tunnels 330 as shown in FIG. 3) are provided as input and tunnels that are associated with reputable domains are removed as shown at 424. The resulting set provides a set of Predicted tunnels as shown at 426 (e.g., such as Predicted Tunnels 114 as shown in FIG. 1).

Predicted tunnels 426 are provided as input for performing a set of Truth Marking operations 430. Specifically, Truth Marking is also used to create sets of known tunnel domains and known domains that are not DNS tunnels but exhibit features of DNS tunnels. Truth Marking tunnels of the Predicted tunnels 426 are performed as shown at 432. Generic DNS Tunnel False Positive (FP) domains 434 are used with the Truth Mark tunnels 432 to provide a known tunnel False Positive (FP) domains class as shown at 436. As also shown in FIG. 4, qtype 10 tunnel domains 438 (e.g., Qtype 10 tunnels refers to DNS tunnels using DNS records where the record type is NULL or has the decimal value 10 such as described in more detail at https://www.farsightsecurity.com/blog/txt-record/recordtype-null-20170308/) are used with the Truth Mark tunnels 432 to provide a known tunnel domains class as shown at 440. These sets of known tunnel domains (440) and known domains that are not DNS tunnels but exhibit features of DNS tunnels (436) are used to train the classifier component (e.g., such as similarly described above with respect to Classifier component 108 as shown in FIGS. 1 and 3).

As would now be apparent to one of ordinary skill in the art, while the above-described embodiments utilize Name Servers to reduce false positives in DNS tunneling detections, various other techniques using name server identity (e.g., name or IP) in a threat detection pipeline can similarly be used to reduce false positives in DNS tunneling detections. As another example, Name Servers selected by a different mechanism, such as by their rank according to their number of queries per day or using name servers of publicly available lists of top hosting domains, can also similarly be used to reduce false positives in DNS tunneling detections.

Figure 5:
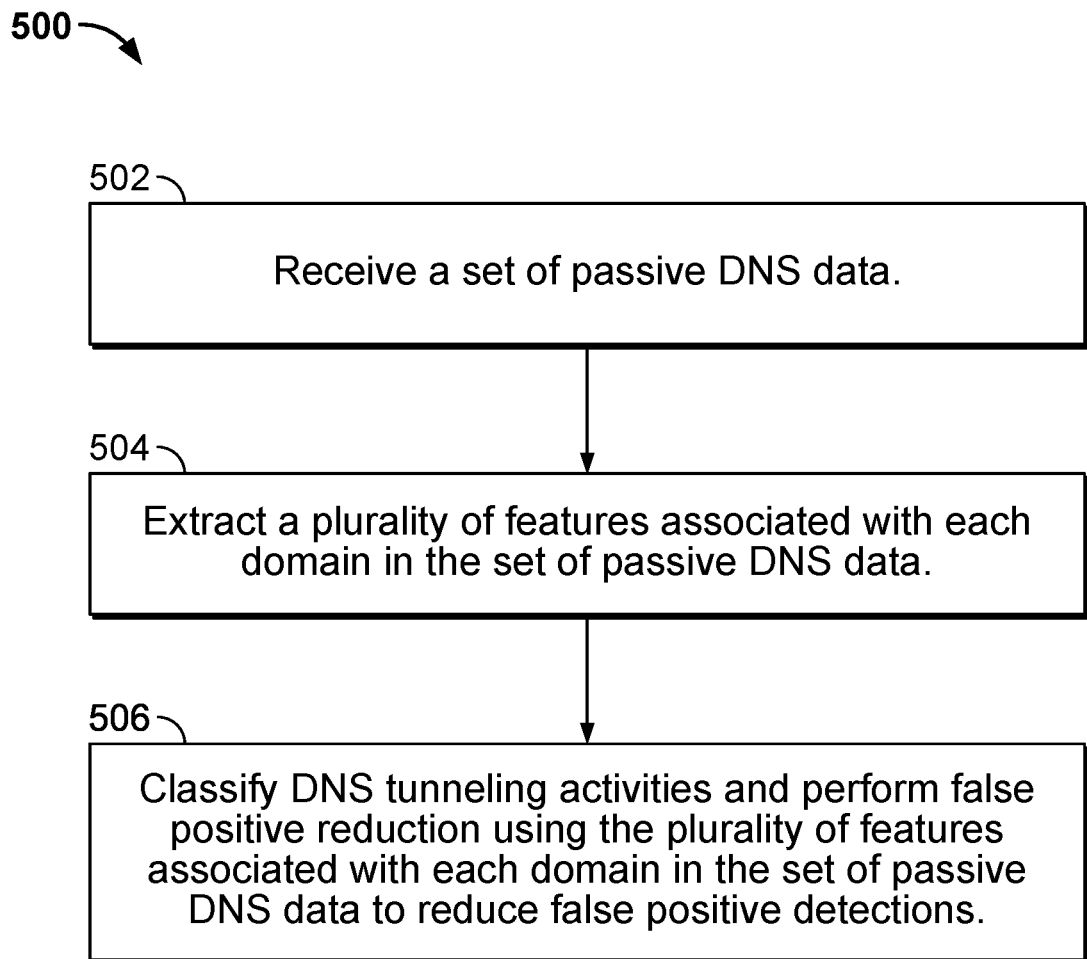
FIG. 5 is a flow diagram illustrating a process for automated identification of false positives in DNS tunneling detectors in accordance with some embodiments.

Example Use Case Scenarios for Automated Identification of False Positives in DNS Tunneling Detectors Example Processes for Automated Identification of False Positives in DNS Tunneling Detectors FIG. 5 is a flow diagram illustrating a process for automated identification of false positives in DNS tunneling detectors in accordance with some embodiments. In various embodiments, process 500 is performed by the system(s) and techniques described above with respect to FIGS. 1 through 4.

At 502, a set of passive DNS data is received. For example, the set of passive DNS data (e.g., the set of passive DNS data includes a DNS query and a DNS response for resolution of the DNS query) can include legitimate and malicious DNST activities.

At 504, a plurality of features associated with each domain in the set of passive DNS data is extracted. For example, various techniques are disclosed for implementing the disclosed feature extraction techniques (e.g., based on name servers) as similarly described above.

At 506, classifying DNS tunneling activities and performing false positive reduction using the plurality of features associated with each domain in the set of passive DNS data to reduce false positive detections is performed. For example, the disclosed automated classification and false positive reduction techniques can be performed as similarly described above.

Figure 6:
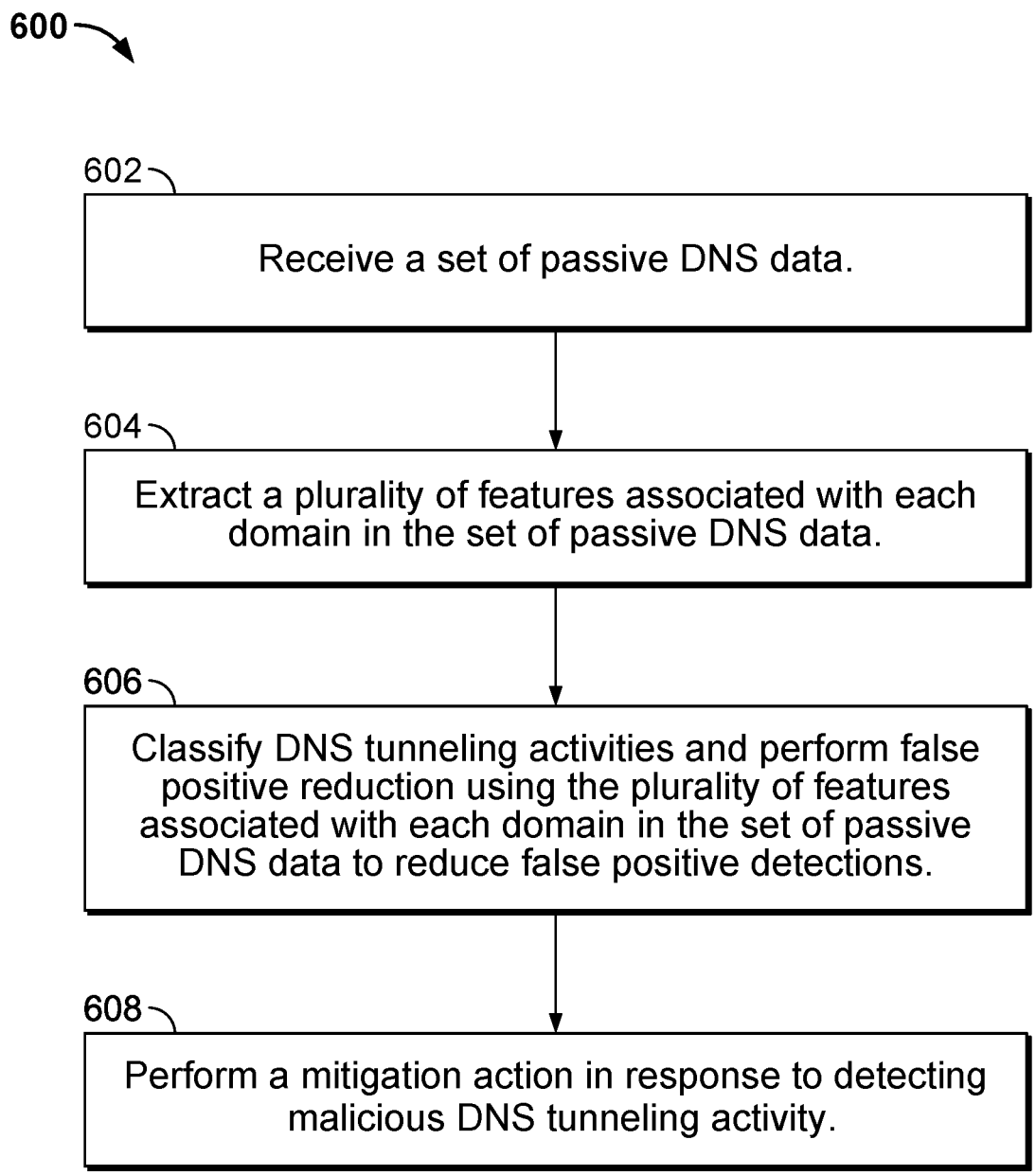
FIG. 6 is another flow diagram illustrating a process for automated identification of false positives in DNS tunneling detectors in accordance with some embodiments.

FIG. 6 is another flow diagram illustrating a process for automated identification of false positives in DNS tunneling detectors in accordance with some embodiments. In various embodiments, process 600 is performed by the system(s) and techniques described above with respect to FIGS. 1 through 4.

At 602, a set of passive DNS data is received. For example, the set of passive DNS data (e.g., the set of passive DNS data includes a DNS query and a DNS response for resolution of the DNS query) can include legitimate and malicious DNST activities.

At 604, a plurality of features associated with each domain in the set of passive DNS data is extracted. For example, various techniques are disclosed for implementing the disclosed feature extraction techniques (e.g., based on name servers) as similarly described above.

At 606, classifying DNS tunneling activities and performing false positive reduction using the plurality of features associated with each domain in the set of passive DNS data to reduce false positive detections is performed. For example, the disclosed automated classification and false positive reduction techniques can be performed as similarly described above.

At 608, a mitigation action is performed in response to detecting malicious DNS tunneling activity. For example, the mitigation action can include a configuration action and/or a filtering action (e.g., block or drop packets to/from the bad/malware network domain and/or bad/malware IP address associated with the potentially malicious network domain). As another example, the mitigation action can include configuring a network device (e.g., a switch or router, implemented as a physical or virtual switch/router) to quarantine the infected host and/or block access to the bad network domain and/or bad IP address associated with DNS tunneling activity, using network access control or other mechanisms to quarantine the infected host and/or block access to the bad network domain and/or bad IP address, configuring a security device controller using Open Flow techniques to configure a network device (e.g., a switch or router, implemented as a physical or virtual switch/router) to quarantine the infected host and/or block access to the bad network domain and/or bad IP address, and/or to implement other configuration/programming techniques such as via API or publish/subscribe mechanisms to configure a network device (e.g., a switch or router, implemented as a physical or virtual switch/router) to quarantine the infected host and/or block access to the bad network domain and/or bad IP address.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
   a processor configured to:
      receive a set of passive DNS data, wherein the set of passive DNS data includes a DNS query and a DNS response for resolution of the DNS query for each of a plurality of DNS queries, and wherein the set of passive DNS data is preprocessed to automatically filter a set of domains included in the set of passive DNS data;
      extract a plurality of features associated with each domain in the set of passive DNS data, wherein the plurality of features includes a first feature and a second feature, wherein the first feature includes a ratio of a number of unique sub-prefixes for a domain to a total number of queries for the domain, and wherein the second feature includes a time span between an earliest observation and a latest observation of a sub-prefix in the domain; and
      classify DNS tunneling activities and perform false positive reduction using the plurality of features associated with each domain in the set of passive DNS data to reduce false positive detections, comprising to:
         classify, using a model, the DNS tunneling activities into a DNS tunnel or a non-tunnel, wherein the model implements a machine learning technique; and
   a memory coupled to the processor and configured to provide the processor with instructions.

2. The system recited in claim 1, wherein one or more of the plurality of features are based on name server information.

3. The system recited in claim 1, wherein one or more of the plurality of features are based on a retransmission rate of queries and/or responses associated with a domain.

4. The system recited in claim 1, wherein the processor is further configured to:
   determine a ratio of a unique number of sub-prefixes to a total number of queries for each domain in a filtered set of passive DNS data.

5. The system recited in claim 1, wherein the processor is further configured to:
   calculate a time span between a latest and an earliest observation of each sub-prefix in each domain in a filtered set of passive DNS data.

6. The system recited in claim 1, wherein the processor is further configured to:
   perform a mitigation action in response to detecting a malicious DNS tunneling activity.

7. The system recited in claim 1, wherein the processor is further configured to:
   detect a malicious DNS tunneling activity; and
   perform a mitigation action in response to detecting the malicious DNS tunneling activity.

8. A method, comprising:
   receiving a set of passive DNS data, wherein the set of passive DNS data includes a DNS query and a DNS response for resolution of the DNS query for each of a plurality of DNS queries, and wherein the set of passive DNS data is preprocessed to automatically filter a set of domains included in the set of passive DNS data;

extracting a plurality of features associated with each domain in the set of passive DNS data, wherein the plurality of features includes a first feature and a second feature, wherein the first feature includes a ratio of a number of unique sub-prefixes for a domain to a total number of queries for the domain, and wherein the second feature includes a time span between an earliest observation and a latest observation of a sub-prefix in the domain; and classifying DNS tunneling activities and performing false positive reduction using the plurality of features associated with each domain in the set of passive DNS data to reduce false positive detections, comprising:
classifying, using a model, the DNS tunneling activities into a DNS tunnel or a non-tunnel, wherein the model implements a machine learning technique.

9. The method of claim 8, wherein one or more of the plurality of features are based on name server information.

10. The method of claim 8, wherein one or more of the plurality of features are based on a retransmission rate of queries and/or responses associated with a domain.

11. The method of claim 8, further comprising:
determining a ratio of a unique number of sub-prefixes to a total number of queries for each domain in a filtered set of passive DNS data.

12. The method of claim 8, further comprising:
calculating a time span between a latest and an earliest observation of each sub-prefix in each domain in a filtered set of passive DNS data.

13. The method of claim 8, further comprising:
performing a mitigation action in response to detecting a malicious DNS tunneling activity.

14. The method of claim 8, further comprising:
detecting a malicious DNS tunneling activity; and
performing a mitigation action in response to detecting the malicious DNS tunneling activity.

15. A computer program product, the computer program product being embodied in a tangible non-transitory computer readable storage medium and comprising computer instructions for:
receiving a set of passive DNS data, wherein the set of passive DNS data includes a DNS query and a DNS response for resolution of the DNS query for each of a plurality of DNS queries, and wherein the set of passive DNS data is preprocessed to automatically filter a set of domains included in the set of passive DNS data;
extracting a plurality of features associated with each domain in the set of passive DNS data, wherein the plurality of features includes a first feature and a second feature, wherein the first feature includes a ratio of a number of unique sub-prefixes for a domain to a total number of queries for the domain, and wherein the second feature includes a time span between an earliest observation and a latest observation of a sub-prefix in the domain; and
classifying DNS tunneling activities and performing false positive reduction using the plurality of features associated with each domain in the set of passive DNS data to reduce false positive detections, comprising:
classifying, using a model, the DNS tunneling activities into a DNS tunnel or a non-tunnel, wherein the model implements a machine learning technique.

16. The computer program product recited in claim 15, wherein one or more of the plurality of features are based on name server information.

17. The computer program product recited in claim 15, wherein one or more of the plurality of features are based on a retransmission rate of queries and/or responses associated with a domain.

* * * * *